United States Patent [19]
Osborn et al.

[11] Patent Number: 6,023,696
[45] Date of Patent: Feb. 8, 2000

[54] SUMMARY TABLE QUERY ROUTING

[75] Inventors: Andrew P. Osborn, Bath; Robert L. Lavender, Somerset; Stephen D. Cave, Gloucester; Paolo Fragapane, Bristol, all of United Kingdom

[73] Assignee: Oracle Corporation, Redwood Shores, Calif.

[21] Appl. No.: 08/962,533

[22] Filed: Oct. 31, 1997

[51] Int. Cl.$^7$ .................................................. G06F 17/30
[52] U.S. Cl. ...................................................... 707/3; 707/4
[58] Field of Search .................................. 707/1, 2, 3, 7, 707/4

[56] References Cited

U.S. PATENT DOCUMENTS

| | | | |
|---|---|---|---|
| 5,675,785 | 10/1997 | Hall et al. | 395/613 |
| 5,710,915 | 1/1998 | McElhiney | 395/603 |
| 5,781,896 | 7/1998 | Dalal | 707/2 |
| 5,845,276 | 12/1998 | Emerson et al. | 707/2 |
| 5,884,307 | 3/1999 | Depledge et al. | 707/7 |

OTHER PUBLICATIONS

Designer's Guide Manual for Business Objects for Window 4.0 (section entitled "Aggregate Navigation"), pp. 133–135, Sep. 1996.

*Primary Examiner*—Paul V. Kulik
*Attorney, Agent, or Firm*—Lyon & Lyon LLP

[57] ABSTRACT

Methods and apparatus for effective and efficient usage of summary tables in a computer system including a database. In a computer system it is common for a database to include one or more summary tables which have pre-generated aggregations of data from one or more original, detailed database tables. In order to achieve the benefits of summary tables, they must be accessed when appropriate. Thus, information regarding the available summary database tables, including summary bitmaps for all the summary tables, is maintained in the metadata of a computer system. This information is updated whenever a summary table is created. The summary bitmaps are a main key for determining if any summary table is responsive to a user query to the computer system. The summary bitmaps map to corresponding SQL statements, which are generated to access the respective summary tables in the database. Once an SQL statement for accessing a respective summary table is identified for a particular user query, that SQL statement is then incorporated in the executable SQL query that is thereafter executed.

25 Claims, 9 Drawing Sheets

| | id | bitmap position | SQL statement | number of axis items | number of join axis items | number of rows | summary threshhold date |
|---|---|---|---|---|---|---|---|
| 121→ | | | | | | | |
| 140→ | 56 | 1 | | 2 | 0 | 2500 | 123199 |
| 145→ | 78 | 2 | | 2 | 0 | 120 | 010199 |
| 150→ | 91 | 3 | | 3 | 1 | 2500 | 110198 |

FIG. 3.

| | id | item | function | summary bitmap |
|---|---|---|---|---|
| 165→ | | | | |
| 170→ | 200 | ENAME | | 1 0 1 0 0 0 0 0 |
| 172→ | 201 | ENO | | 1 0 0 0 0 0 0 0 |
| 174→ | 269 | DEPTNO | | 0 1 0 0 0 0 0 0 |
| 176→ | 272 | SAL | sum | 0 1 0 0 0 0 0 0 |
| 178→ | 304 | DNAME | | 0 0 1 0 0 0 0 0 |
| 180→ | 307 | EMP. DEPTNO = DEPT. DEPTNO | | 0 0 1 0 0 0 0 0 |

FIG. 4.

352　　　354　　　356　　　　350 select object_id, no_of axis_items, object_sql

358 from eul$summary_objects

368 where no_of_ joins = :no_of_joins in query

360 and bitmap_position in (13, 46, 286)

372　　　　376　　　374

370 and summary_threshold_date > sysdate - :max _age_of_summary 364　　　366

362 order by no_of_axis_items, no_of_rows

FIG. 8.

SUMMARY TABLE QUERY ROUTING

FIELD OF THE INVENTION

The present invention pertains to the field of database systems, including, more particularly, the use of summary tables.

BACKGROUND OF THE INVENTION

In a database management system ("DBMS"), including a relational database, the retrievable data is typically stored in the form of tables. Typically each column of a given table represents a particular data attribute while each row represents a specific record. The row/column combination, i.e., each field of a row, represents a particular data item. A user of the database accesses data from one or more tables in the database by submitting a query to the DBMS. The DBMS typically responds to the query by constructing a particular view of the data stored in the tables and returning a responsive data set to the user.

In known large database management systems, users often issue queries which require aggregation of data from large tables and/or which require the aggregation of data from two or more tables. Responding to such queries can be time consuming. As a result, it is not uncommon for a database to include one or more summary tables, which contain selected subsets of data items, and/or aggregations of data items from one or more tables. A particular advantage of summary tables is that they allow the DBMS to more quickly access and retrieve queried data, a task that could otherwise be costly and time consuming.

For summary tables to be effective, however, they must be used (i.e., accessed). In known database systems, (i.e., systems including a DBMS and a database) the application (i.e., program) that generates an executable query for information from the database tables has to be aware of which summary tables exist, and the information (i.e., data items) they contain. These database systems require much overhead to coordinate between the creation of summary tables and the identification of the created summary tables to the respective applications. Additionally, these database systems require that the applications maintain detailed knowledge of each summary table in the database system.

Thus, it would be desirable to provide an efficient system and methodology for accessing summary tables. Additionally, it would be desirable for a user to be able to access summary tables without requiring the user to have particular knowledge of the summary tables being accessed. Further, it would be desirable to be able to select an optimum summary table to access in response to a query.

SUMMARY OF THE INVENTION

The present invention includes methods and apparatus for automatically and transparently routing user queries to use summary tables containing pre-generated results. In this manner, efficient and effective summary table usage is obtained, and overall system performance is improved.

In one aspect of the present inventions, summary tables are accessed whenever it is logically possible to do so for a given query.

In another aspect of the present inventions, the time to detect the ability, or lack thereof, to use a summary table, based upon a given user-submitted query is minimized. In a presently preferred embodiment, this is accomplished with the use of bitmaps.

In another aspect of the present invention, the performance of responding to queries is improved by rewriting user submitted queries with statements that access summary tables containing pre-generated responses, thereby retrieving fewer records and avoiding and/or minimizing the resultant response time.

In a presently preferred embodiment, information regarding available summary tables is maintained in metadata in a computer system. The relevant metadata is preferably updated whenever a summary table is defined or created, and it may include a summary bitmap for all existing summary tables.

In another aspect of the present invention, a process is employed to identify an SQL statement for accessing an optimum summary table, for use in servicing a user-submitted query.

A presently preferred embodiment for processing a user-submitted query includes the following: verifying that the data attributes, joins and aggregate attribute/functions in the user-submitted query are represented in a Summary Bitmap table; retrieving information from the Summary Bitmap table; processing the retrieved information; retrieving certain SQL statements corresponding to the processed information; and, selecting a preferred SQL statement to use to access an appropriate summary table in response to the user-submitted query.

Other and further objects, features, aspects and advantages of the present inventions are found in the following detailed description of the preferred embodiments and the accompanying drawings.

BRIEF DESCRIPTION OF THE ACCOMPANYING DRAWINGS

The drawings illustrate both the design and utility of preferred embodiments of the present invention, in which:

FIG. 3 depicts an exemplary Summary Derived Objects table stored in the computer system of FIG. 1A;

FIG. 4 depicts an exemplary Summary Bitmap table stored in the computer system of FIG. 1A;

FIG. 8 is an exemplary SQL query for retrieving SQL statements from the Summary Derived Object table of FIG. 3.

DETAILED DESCRIPTION OF THE PREFERRED EMBODIMENTS

In the following description, for purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

SYSTEM ARCHITECTURE OVERVIEW

A computer system generally may take many forms, from a configuration including a variety of processing units, as further described herein, networked together to function as a integral entity, to a single computer, e.g., a personal computer, operational in a stand-alone environment. The present invention can be embodied in any of these computer system configurations.

Figure 1A:
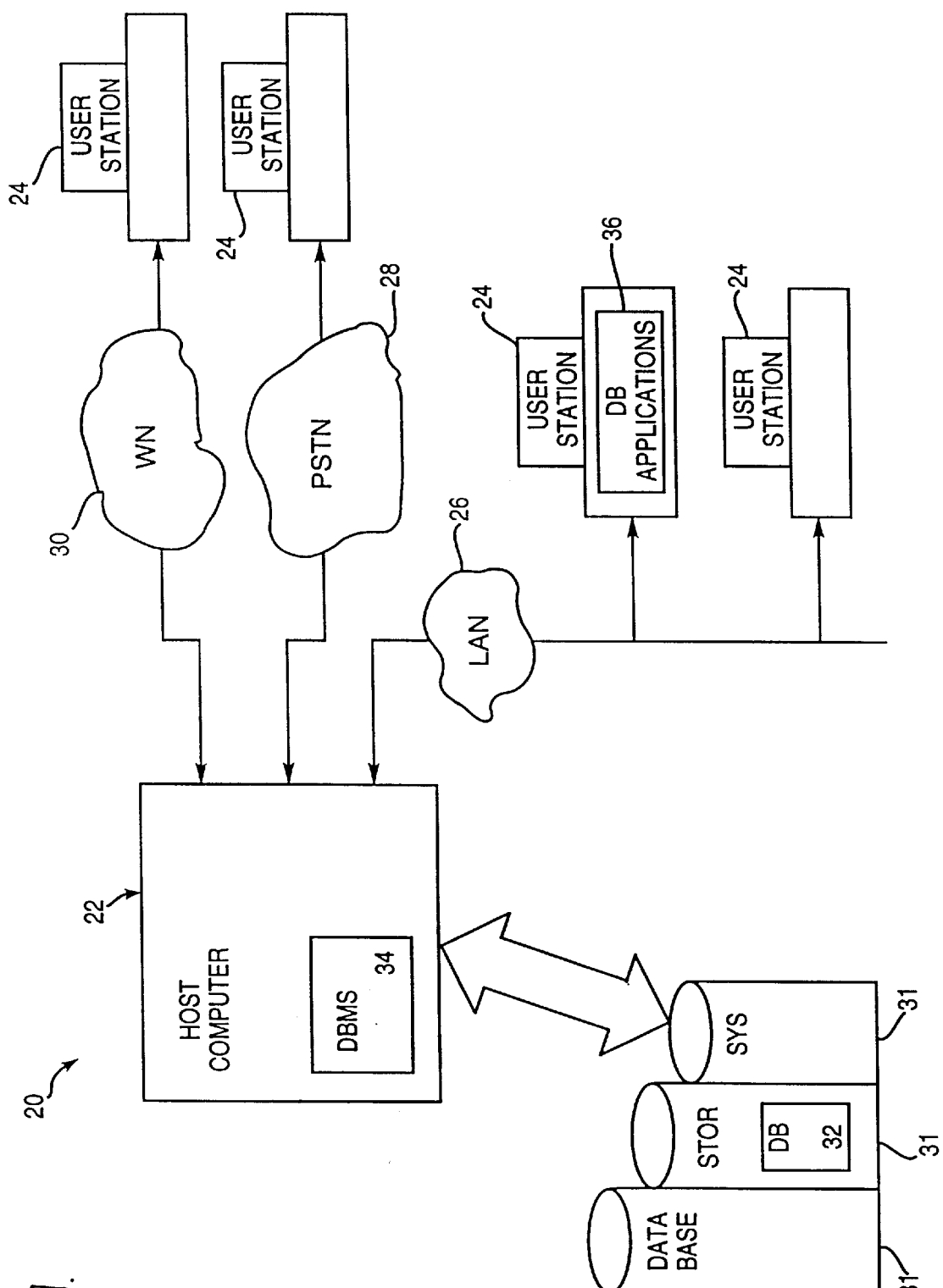
FIG. 1A is a simplified block diagram of an exemplary computer system operating in conjunction with a database.

Referring to FIG. 1A, in a presently preferred embodiment, a computer system 20 includes a host computer 22 connected to a plurality of individual user stations 24. In a presently preferred embodiment, the user stations 24 each comprise suitable data terminals, such as, e.g., personal computers, portable laptop computers, or personal data assistants ("PDAs"), which can store and independently run one or more applications (i.e., programs). For purposes of illustration, some of the user stations 24 are connected to the host computer 22 via a local area network ("LAN") 26. Other user stations 24 are remotely connected to the host computer 22 via a public telephone switched network ("PSTN") and/or a wireless network 30.

In a presently preferred embodiment, the host computer 22 operates in conjunction with a data storage system 31, wherein the storage system 31 contains a database 32 that is readily accessible by the host computer 22. In a presently preferred embodiment, the database 32 is a relational database.

In alternative embodiments, the database 32 may be resident on the host computer, stored, e.g., in the host computer's ROM, PROM, EPROM, or any other memory chip, and/or its hard disk. In yet alternative embodiments, the database 32 may be read by the host computer 22 from one or more floppy disks, flexible disks, magnetic tapes, any other magnetic medium, CD-ROMs, any other optical medium, punchcards, papertape, or any other physical medium with patterns of holes, or any other medium from which a computer can read.

The host computer 22 includes a database management system ("DBMS") 34, which is one or more programs and/or hardware circuitry, configured to access data stored in the database 32. In a presently preferred embodiment, each of the user stations 24 includes its own database applications layer 36, which is one or more programs and/or hardware circuitry configured to interact with the DBMS 34.

The respective database applications layer 36 of a user station 24 allows a user of the computer system 20 to access data from the database 32 by forming and submitting queries on the user station 24. In particular, in a presently preferred embodiment, a user-submitted query is converted into an SQL statement by the database applications layer 36 resident in the respective user station 24. SQL is a standard language used in relational database management systems. An SQL query is the respective user query formatted in SQL. The SQL query is issued to the DBMS 34, which executes the SQL query and returns a responsive data result set to the user.

Although SQL is a presently preferred language, other languages may alternatively be used for executable queries. In other alternative embodiments, a user query may be submitted to a respective database applications layer 36 in an appropriate language format for execution by the DBMS 34.

In alternative embodiments, an equivalent of the database applications layer 36 may reside on a server system (e.g., a SUN® SPARCstation™) with one or more user stations 24 (i.e., "thin clients") either locally, or remotely, connected to the server system. In this alternative configuration, the thin clients support an appropriate user interface, which is generally one or more programs that assist a user to access the database 32. In other alternative embodiments, the user stations 24 are "dumb" terminals. In this alternative configuration, an equivalent of the database applications layer 36 may reside on the host computer 22, along with the DBMS 34, or, alternatively, can reside on a separate, second computer (not shown) which interfaces with the host computer 22.

Figure 1B:
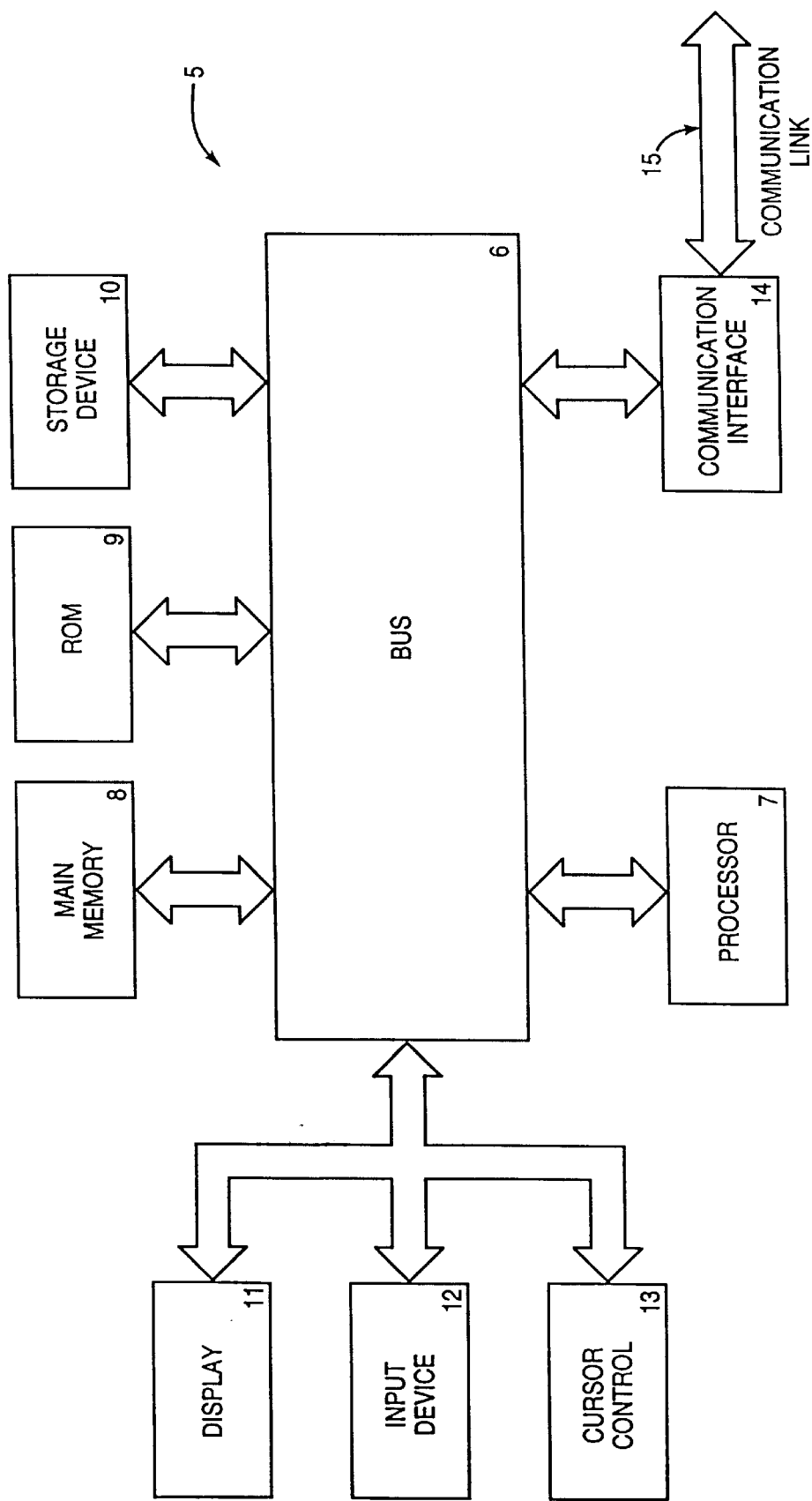
FIG. 1B is a simplified block diagram of an exemplary user station and an exemplary host computer of FIG. 1A.

Referring to FIG. 1B, in a presently preferred embodiment, each user station 24 and the host computer 22 (each referred to generally as a processing unit) embodies a general architecture 5. A processing unit includes a bus 6 or other communication mechanism for communicating instructions, messages and data (collectively, information), and one or more processors 7 coupled with the bus 6 for processing information. A processing unit also includes a main memory 8, such as a random access memory (RAM) or other dynamic storage device, coupled to the bus 6 for storing dynamic data and instructions to be executed by the processor(s) 7. The main memory 8 also may be used for storing temporary data (i.e., variables) or other intermediate information during execution of instructions by the processor(s) 7.

A processing unit may further include a read only memory (ROM) 9 or other static storage device coupled to the bus 6 for storing static data and instructions for the processor(s) 7. A storage device 10, such as a magnetic disk or optical disk, may also be provided and coupled to the bus 6 for storing data and instructions for the processor(s) 7.

A processing unit may be coupled via the bus 6 to a display 11, such as a cathode ray tube (CRT), for displaying information to a user. An input device 12, including alphanumeric and other keys, is coupled to the bus 6 for communicating information and command selections to the processor(s) 7. Another type of user input device may include a cursor control 13, such as a mouse, a trackball, a fingerpad, or cursor direction keys for communicating direction information and command selections to the processor(s) 7 and for controlling cursor movement on the display 11.

According to one embodiment of the invention, the individual processing units perform specific operations by their respective processor(s) 7 executing one or more sequences of one or more instructions contained in the main memory 8. Such instructions may be read into the main memory 8 from another computer-readable medium, such as the ROM 9 or the storage device 10. Execution of the sequences of instructions contained in the main memory 8 causes the processor(s) 7 to perform the process steps described herein. In alternative embodiments, hard-wired circuitry may be used in place of or in combination with software instructions to implement the invention. Thus, embodiments of the invention are not limited to any specific combination of hardware circuitry and/or software.

The term "computer-readable medium", as used herein, refers to any medium that provides information to the processor(s) 7. Such a medium may take many forms, including, but not limited to, non-volatile, volatile and transmission media. Non-volatile media, i.e., media that can retain information in the absence of power, includes the ROM 9. Volatile media, i.e., media that can not retain information in the absence of power, includes the main memory 8. Transmission media includes coaxial cables, copper wire and fiber optics, including the wires that comprise the bus 6. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 7 can retrieve information.

Various forms of computer-readable media may be involved in providing one or more sequences of one or more instructions to the processor(s) 7 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 6 may receive the infrared signals and place the instructions therein on the bus 6. The bus 6 may carry the instructions to the main memory 8, from which the processor(s) 7 thereafter retrieves and executes the instructions. The instructions received by the main memory 8 may optionally be stored on the storage device 10, either before or after their execution by the processor(s) 7.

Each processing unit may also include a communication interface 14 coupled to the bus 6. The communication interface 14 provides two-way communication between the respective user stations 24 and the host computer 22. The communication interface 14 of a respective processing unit transmits and receives electrical, electromagnetic or optical signals that include data streams representing various types of information, including instructions, messages and data.

A communication link 15 links a respective user station 24 and a host computer 22. The communication link 15 may be a LAN 26, in which case the communication interface 14 may be a LAN card. Alternatively, the communication link 15 may be a PSTN 28, in which case the communication interface 14 may be an integrated services digital network (ISDN) card or a modem. Also, as a further alternative, the communication link 15 may be a wireless network 30.

A processing unit may transmit and receive messages, data, and instructions, including program, i.e., application, code, through its respective communication link 15 and communication interface 14. Received program code may be executed by the respective processor(s) 7 as it is received, and/or stored in the storage device 10, or other associated non-volatile media, for later execution. In this manner, a processing unit may receive messages, data and/or program code in the form of a carrier wave.

DATABASE TABLES AND QUERIES

Figure 2:
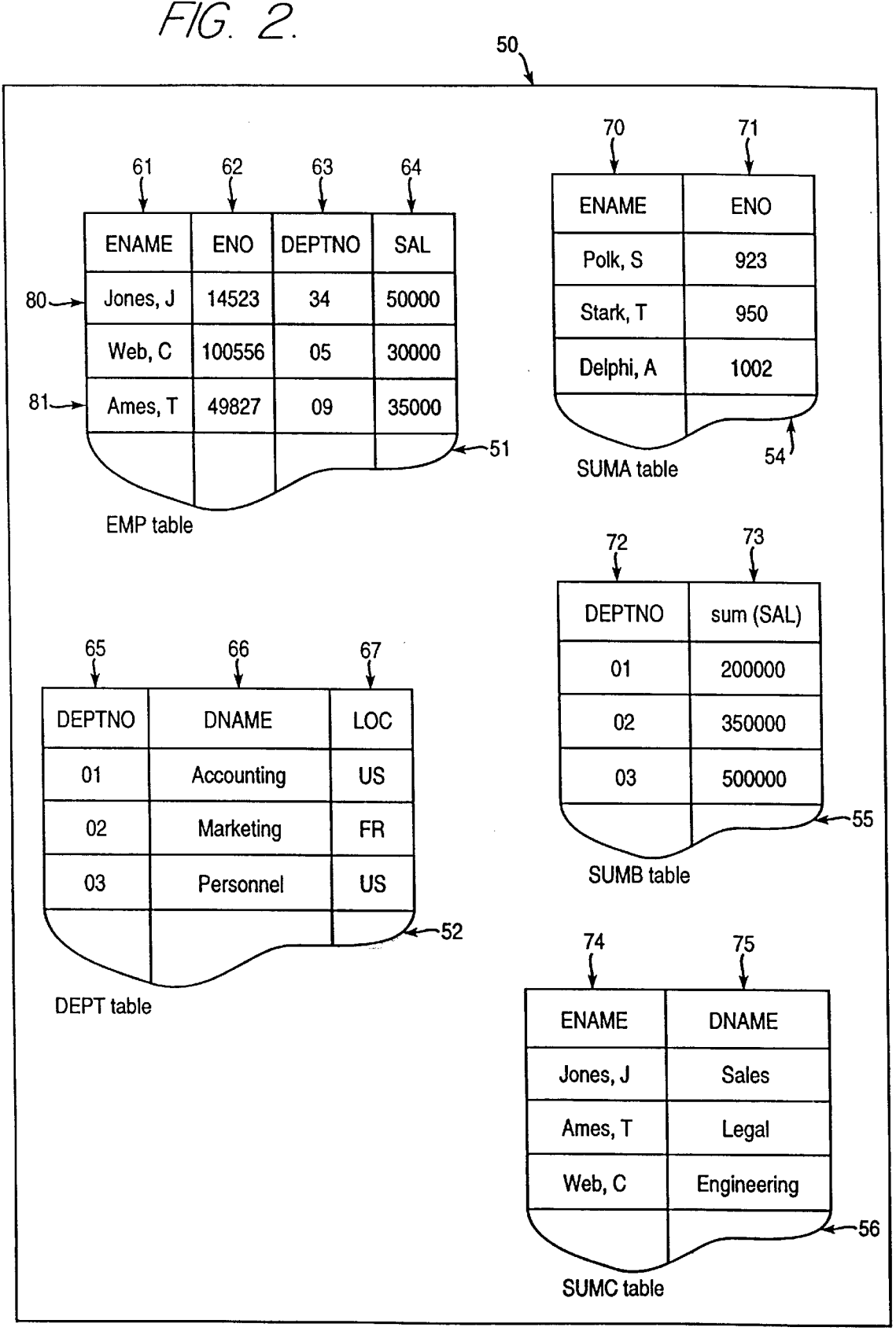
FIG. 2 depicts an exemplary database including both original, detailed tables and summary tables.

Referring to FIG. 2, exemplary database 50 has two original, detailed database tables: the EMP (employee) table 51 and the DEPT (department) table 52, both containing information for a respective company. If a user query requests the employee name (ENAME) and employee number (ENO) for each employee of a company, the respective SQL query would select the data items from the ENAME 61 and the ENO 62 data attributes of the EMP table 51.

ENAME and ENO of the respective SQL query are the axis items of that query. More generally, an axis item is any data attribute, join or aggregate attribute/function used in a query. ENAME and ENO in the previous example are data attributes—they are each a column in the EMP table 51. Joins and aggregate attribute/functions are described below, with regard to summary tables.

SUMMARY TABLES

For tables in a database with a large number of records, a responsive data result set generation process for a user query may be quite resource and time intensive. To improve runtime performance, responsive data result set values are often pre-generated and stored in summary tables that contain summarized data from one or more other tables. An SQL query that accesses a summary table will generally process more quickly than a corresponding SQL query that accesses the original data table(s).

For example, referring to FIG. 2, SUMA table 54, SUMB table 55 and SUMC table 56 are summary tables. Each of these summary tables was created from one or more original, detailed tables in the database 50.

The SUMA table 54 contains the employee names (i.e., ENAME column 74) and corresponding employee numbers (i.e., ENO column 71) of the employees in the respective company. The SUMA table 54 data items were derived from the EMP table 51. An SQL query that selects the ENAME column 61 and the ENO column 62 data items from the EMP table 51, when executed, populates the SUMA table 54.

An SQL query accessing the SUMA table 54 will generally execute faster than a corresponding SQL query accessing the EMP table 51, as the SUMA table 54 has less data attributes, and, therefore, less data items, to be dealt with than the EMP table 51.

An SQL query for the ENAME column 61 data items and the ENO column 62 data items of each employee in the respective company has two axis items: ENAME and ENO. Both ENAME and ENO are data attributes, as they are each a column in a respective original table.

The SUMP table 55 contains the salary summation (i.e., sum(SAL) column 73) for each department number (i.e., DEPTNO column 72) in the respective company. The SUMB table 55 data items were derived from the EMP table 51. An SQL query that sums the salaries (i.e., sum(SAL 64)aggregate attribute/function) for each department number (i.e., DEPTNO column 63) of the EMP table 51, when executed, populates the SUMB table 55.

An SQL query accessing the SUMB table 55 will generally execute faster than a corresponding SQL query accessing the EMP table 51. The SUMB table 55 already has the salary summation for each department number pre-computed and stored therein, whereas, by accessing the EMP table 51, the salary summation for each department number has to be computed before a responsive data result set can be provided to the user.

An SQL query for the salary summation (i.e., sum(SAL 64) aggregate attribute/function) for each department number (i.e., DEPTNO data attribute 63) in the respective company has two axis items: DEPTNO and sum(SAL). DEPTNO is a data attribute, as it is a column in a respective original table. Sum(SAL) is an aggregate attribute/function, as it is a function (i.e., operation) on a data attribute (i.e., SAL data attribute 64).

A particular value in a data item in a column in a table may appear more than once. For example, the data item value "34" appears more than once in the DEPTNO (i.e., department number) column 63 of the EMP table 51 (i.e., in records 80 and 81). This is because, the EMP table 51 is a compilation of information about each employee in the respective company, and more than one employee is likely in the same department number. Because the DEPTNO column 63 of the EMP table 51 does not have unique values in each of its respective data items, it is not a key to the EMP table 51.

The DEPTNO column 65 of the DEPT table 52, however, does have one unique value in each of its respective data items. This is because the DEPT table 52 is a compilation of the individual department numbers (i.e, DEPTNO column 65) and their respective department names (i.e., DNAME column 66) and locations (i.e., LOC column 67), and each department in the respective company has a unique department number identifier. As the DEPTNO column 65 does have unique values in each of its respective data items, it is a key to the DEPT table 52. The DEPTNO column 65 key may be used to "join" the DEPT table 52 to another table with the same DEPTNO data attribute.

When two database tables have a data attribute in common, the data attribute may be a join between the two tables. For example, a user-submitted query could request the department name for each employee name in the respective company. A corresponding SQL query for the ENAME column 61 data items from the EMP table 51 and the corresponding DNAME column 66 data items from the DEPT table 52 with a join of the two tables via their respective DEPTNO data attributes 63 and 65 (i.e., EMP.DEPTNO=DEPT.DEPTNO join), is capable of generating a responsive data result set not wholly in either table, but completely represented by both. A join can be used to access two or more database tables that each alone do not, but collectively do, contain all the necessary data items for a responsive data result set.

The SUMC table 56 contains the DNAME column 77 data items for each ENAME column 76 data item in the respective company. The SUMC table 56 data items were derived from the EMP table 51 and the DEPT table 52. An SQL query that selects the ENAME column 61 data items and the DNAME column 66 data items, joining the EMP table 51 and DEPT table 52 by their respective DEPTNO data attributes 63 and 65 respectively, when executed, populates the SUMC table 56.

An SQL query accessing the SUMC table 56 will generally execute faster than a corresponding SQL query accessing the EMP table 51 and the DEPT table 52. The SUMC table 56 already has the results of a join of the EMP table 51 and the DEPT table 52 contained therein, and, thus, a respective SQL query accessing the SUMC table 56 does not require accessing two tables, a generally more time consuming process.

An SQL query for the DNAME column 66 data items for each ENAME column 61 data items in the respective company has three axis items: DENAME, ENAME, and EMP.DEPTNO=DEPT.DEPTNO. DNAME and ENAME are data attributes, as they are each columns in a respective original table. EMP.DEPTNO=DEPT.DEPTNO is a join between the EMP table 51 and the DEPT table 52.

A database applications layer 36 may automatically generate summary table creation recommendations and automatically request the DBMS 34 to create summary tables, based on summary table creation recommendations requested and selected by a database administrator ("DBA"), as disclosed in U.S. patent application Ser. No. 08/962,029, entitled "Summary Table Management In A Computer System", filed on the same day as the present application, and fully incorporated in this application by reference. Further details on summary table creation recommendation criteria are disclosed in U.S. patent application Ser. No. 08/962,538, entitled "Systems And Methods For Estimating Query Response Times In A Computer System", filed on the same day as the present application, and fully incorporated in this application by reference.

METADATA

In a presently preferred embodiment a Summary Derived Object table corresponding to the summary tables in a database is created and stored in the computer system's metadata. As used in this application, metadata is data about other data. Metadata may take the form of one or more tables that contain information about the respective tables in a database. For example, a metadata table may contain the identification, location, number or rows (i.e., records), number of data attributes (i.e., columns), and creation date of each table in a database.

Referring to FIG. 3, a record 121 (also referred to as a Summary Derived Object) is created in the Summary Derived Object table 120 for each summary table in the respective database 50. Each record 121 is generated by the database applications layer 36 of a user station 24 from which the respective summary table creation was requested. For details on summary table creation, refer to U.S. patent application Ser. No. 08/962,029, which is incorporated in this application by reference.

A Summary Derived Object 121 in the Summary Derived Object table 120 includes: an id 124; a bitmap position 126; an SQL statement 128 used to retrieve the data items from the respective summary table; a number of axis items 130; a number of join axis items 131; a number of rows 132; and, a summary threshold date 134.

The id 124 of a Summary Derived Object 121 is a unique identifier of the particular Summary Derived Object 121. The bitmap position 126 of a Summary Derived Object is the identification of a corresponding bit location in a summary bitmap, to be described below, which corresponds to the Summary Derived Object.

As previously described, an SQL statement 128 is basically an SQL query used to select the data items of the respective summary table corresponding to the Summary Derived Object 121. More particularly, in a presently preferred embodiment, an SQL statement 128 is a computer-internal representation of a respective SQL query. An SQL statement 128 is generated by the database applications layer 36 of a respective user station 24 from which a summary table creation request has been made, and is included in the respective Summary Derived Object 121 corresponding to the respective summary table.

The number of axis items 130 in a Summary Derived Object 121 is the number of axis items (i.e., data attributes, aggregate attribute/functions and joins) in the SQL query used to populate the corresponding summary table when it is created. The number of join axis items 131 is the number of join axis items in the SQL query used to populate the corresponding summary table when it is created. The number of rows 132 is the number of rows, i.e., records, in the corresponding summary table.

In a presently preferred embodiment, the summary threshold date 134 of a Summary Derived Object 121 is set by the database applications layer 36 of the respective user station 24 from which a summary table creation request is made. The summary threshold date 134 is used when the corresponding SQL statement 128 is retrieved from the Summary Derived Object table 120 during execution of a Summary Detection procedure, as further described below.

A Summary Derived Object 121 is generated for each summary table of a database 50, when the summary table is designated to be created. (In a presently preferred embodiment, summary table creation may actually be delayed, and performed in a batch job at some later time from when it is designated to be created, to optimize overall system performance.) For example, when the SUMA table 54, the SUMB table 55 and the SUMC table 56 of FIG. 2 were designated to be created, corresponding Summary Derived Objects 140, 145 and 150 respectively were generated and stored in the Summary Derived Object table 120 of FIG. 3.

Summary Derived Object 140 corresponds to the SUMA table 54 and contains an id 124 of "56", a bitmap position 126 of "1", and an SQL statement that selects the data items from the ENAME column 70 and the ENO column 71 of the SUMA table 54. The SQL statement used to populate the SUMA table 54 selected the ENAME column 61 data items and the corresponding ENO column 62 data items from the EMP table 51, and, therefore, has two axis items (i.e., ENAME and ENO). Thus, the number of axis items 130 of the Summary Derived Object 140 is set to a value of "2". As there are no join axis items in the SQL query used to populate the SUMA table 54, all of the data items in the SUMA table 54 derived from the EMP table 51, the number of join axis items 131 of the Summary Derived Object 140 is set to a value of "0".

Assuming the SUMA table 54 has 2500 rows, or records, in it, the number of rows 132 of the Summary Derived Object 140 is set to a value of "2500". The summary threshold date 134 for the Summary Derived Object 140 is set in this example to indicate the date Dec. 31, 1999.

The Summary Derived Object 145 corresponds to the SUMB table 55 and contains an id 124 of "78", a bitmap position 126 of "2", and an SQL statement that selects the data items from the DEPTNO column 72 and the sum(SAL) column 73 of the SUMB table 55. The SQL statement used to populate the SUMB table 55 selected the DEPTNO column 63 data items and performed a summation function on the corresponding SAL column 64 data items of the EMP table 51, and, therefore, has two axis items (i.e., DEPTNO and sum(SAL)). Thus, the number of axis items 130 of the Summary Derived Object 145 is set to a value of "2".

There are no join axis items in the SQL query used to populate the SUMB table 55, as all of the data items of the SUMB table 55 are derived from the EMP table 51. Thus, the number of join axis items 131 of the Summary Derived Object 145 is set to a value of "0".

Assuming the SUMB table 55 has 120 rows, the number of rows 132 of the Summary Derived Object 145 is set to a value of "120". The summary threshold date 134 for the Summary Derived Object 145 is set in this example to indicate the date Jan. 1, 1999.

The Summary Derived Object 150 corresponds to the SUMC table 56 and contains an id 124 of "91", a bitmap position 126 of "3", and an SQL statement that selects the data items from the ENAME column 74 and the DNAME column 75 of the SUMC table 56. The SQL statement used to populate the SUMC table 56 selected the ENAME column 61 data items from the EMP table 51 and the corresponding DNAME column 66 data items from the DEPT table 52, joining the tables with the EMP.DEPTNO=DEPT.DEPTNO join. Thus, the SQL statement used to populate the SUMC table 56 has three axis items (i.e., ENAME, DNAME and EMP.DEPTNO=DEPT.DEPTNO), and the number of axis items 130 of the Summary Derived Object 150 is set to a value of "3".

There is one join axis item in the SQL query used to populate the SUMC table 56 (i.e., EMP.DEPTNO=DEPT.DEPTNO). Thus, the number of join axis items 131 of the Summary Derived Object 150 is set to a value of "1".

Assuming the SUMC table 56 has 2500 rows, the number of rows 132 of the Summary Derived Object 150 is set to a value of "2500". The summary threshold date 134 for the Summary Derived Object 150 is set in this example to indicate the date Nov. 1, 1998.

In a presently preferred embodiment, a Summary Bitmap table for the summary tables in a database is also created and stored in the computer system's metadata. A Summary Bitmap table contains a record for each data attribute, aggregate attribute/function and join (collectively, axis items) of a respective SQL query used to populate a corresponding summary table. Each record of the Summary Bitmap table includes a summary bitmap, with each bit in each bitmap related to a Summary Derived Object 121, and thus, to a particular summary table in the database.

Referring to FIG. 4, a record 165 in the Summary Bitmap table 160 includes an id 166, an item 167, a function 168, if the respective item 167 is an aggregate attribute/function, and a summary bitmap 169. For each summary table that is designated to be created, the database applications layer 36 of the respective user station 24 from which the summary table creation request is made also generates, or updates, if a respective record 165 already exists, a record 165 for each axis item in the SQL query used to populate the respective summary table. The respective records 165 are stored in the Summary Bitmap table 160 in the computer system's metadata.

For example, assuming the SUMA table 54 is the first summary table designated to be created for a respective database, when it was so designated, the respective database applications layer 36 generated records 170 and 172 in the Summary Bitmap table 160 of FIG. 4. As previously described, the SQL query for populating the SUMA table 54 selects the ENAME column 61 data items and the ENO column 62 data items for each employee in a respective company. Thus, ENAME and ENO are the axis items of the SQL query used to populate the SUMA table 54.

Record 170 corresponds to axis item ENAME: the id 166 is set to an exemplary value of "200" and the item 167 is ENAME. The function 168 of record 170 is not set, as there is no function associated with the ENAME data attribute 61 of the SQL query used to populate the SUMA table 54. The summary bitmap 169 of record 170 has a value of "$10100000_2$" (i.e., 10100000 base 2=160 base 10). The import of the value of the summary bitmap 169 for the records 165 of the Summary Bitmap table 160 is explained below.

Record 172 corresponds to axis item ENO: the id 166 is set to an exemplary value of "201" and the item 167 is ENO. The function 168 of record 172 is not set, as there is no function associated with the ENO data attribute 62 of the SQL query used to populate the SUMA table 54. The summary bitmap 168 of record 172 has a value of "$10000000_2$".

Similarly, when the SUMB table 55 was designated to be created, the respective database applications layer 36 generated records 174 and 176 in the Summary Bitmap table 160 of FIG. 4. As previously described, the SQL query for populating the SUMB table 55 generates the salary summation (i.e., sum(SAL 64)) for each unique DEPTNO column 63 data item in a respective company. Thus, DEPTNO and sum(SAL) are the axis items of the SQL query used to populate the SUMB table 55.

Record 174 corresponds to axis item DEPTNO: the id 166 is set to an exemplary value of "269" and the item 167 is DEPTNO. The function 168 of record 174 is not set, as there is no function associated with the DEPTNO data attribute 63 of the SQL query used to populate the SUMB table 55. The summary bitmap 169 of record 174 has a value of "01000000$_2$".

Record 176 corresponds to axis item sum(SAL): the id 166 is set to an exemplary value of "272" and the item 167 is SAL. The function 168 of record 176 is set as the sum function is associated with the SAL data attribute 64 of the SQL query used to populate the SUMB table 55. The summary bitmap 169 of record 176 has a value of "01000000$_2$".

Similarly, when the SUMC table 56 was designated to be created, the respective database applications layer 36 generated new records 178 and 180 and updated pre-existing record 170 in the Summary Bitmap table 160 of FIG. 4. As previously described, the SQL query for populating the SUMC table 56 selects the ENAME column 61 and the corresponding DNAME column 66 data items for each employee in a company, using the EMP.DEPTNO=DEPT.DEPTNO join to join the EMP table 51 and the DEPT table 52. Thus, ENAME, DNAME and EMP.DEPTNO=DEPT.DEPTNO are the axis items of the SQL query used to populate the SUMC table 56.

Record 178 corresponds to axis item DNAME: the id 178 is set to an exemplary value of "304" and the item 167 is DNAME. The function 168 of record 178 is not set, as there is no function associated with the DNAME data attribute 66 of the SQL query used to populate the SUMC table 56. The summary bitmap 169 of record 178 has a value of "00100000$_2$".

Record 180 corresponds to axis item EMP.DEPTNO=DEPT.DEPTNO: the id 178 is set to an exemplary value of "307" and the item 167 is EMP.DEPTNO=DEPT.DEPTNO. The function 168 of record 178 is not set, as there is no function associated with the EMP.DEPTNO=DEPT.DEPTNO join of the SQL query used to populate the SUMC table 56. The summary bitmap 169 of record 180 has a value of "00100000$_2$".

Record 170 corresponds to the ENAME item 167, and was initially generated when the SUMA table 54 was designated to be created. Now, when the SUMC table 56 is designated to be created, the ENAME item 167 being an axis items in the SQL query used to generate the SUMC table 56, the summary bitmap 169 of record 170 is updated as described below.

As shown in FIG. 4, each record 165 in the Summary Bitmap table 160 has a summary bitmap 169 data item. Each bit in each respective summary bitmap 169 corresponds to a Summary Derived Object 121 of the Summary Derived Object table 120.

Figure 5A:
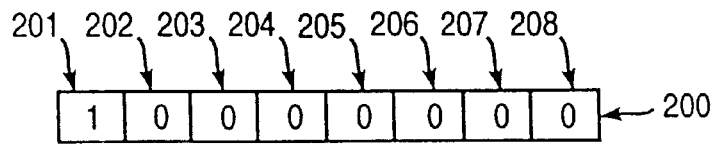
FIGS. 5A–5D depict exemplary summary bitmaps for the Summary Bitmap table of FIG. 4.

Referring to FIG. 5a, and assuming for purposes of illustration that summary bitmaps are one byte (i.e., eight bits), each bit 201–208 of exemplary summary bitmap 200 corresponds to a Summary Derived Object 121. More specifically, the first bit 201 (i.e., bit "1") of the summary bitmap 200 corresponds to a Summary Derived Object 121 with a bitmap position 126 value of "1"; the second bit 202 (i.e., bit "2") corresponds to a Summary Derived Object 121 with a bitmap position 126 value of "2; the third bit 203 (i.e., bit "3") corresponds to a Summary Derived Object 121 with a bitmap position 126 value of "3"; and so on.

In a presently preferred embodiment, a bit 201–208 in the summary bitmap 200 is set to a value of "1" if its respective item 167 is an axis item in the SQL query used to populate the summary table corresponding to the Summary Derived Object 121 with a bitmap position 126 value equal to the bit 201–208 position.

For example, assume summary bitmap 200 is the corresponding summary bitmap 169 for record 172 in the Summary Bitmap table 160. As previously discussed, the ENO item 167 of record 172 is an axis item in the SQL query used to populate the SUMA table 54. Also as previously discussed, the Summary Derived Object 140 of the Summary Derived Object table 120 was generated for, and therefore corresponds with, the SUMA table 54. The bitmap position 126 for the Summary Derived Object 140 has a value of "1". Thus, a value of "1" in the first bit 201 (i.e., bit "1") of the summary bitmap 200 for the ENO item 167 indicates that the ENO item 167 is associated with the Summary Derived Object 140 having a bitmap position 126 value of "1", and, thus, is associated with the SUMA table 54.

In a presently preferred embodiment, a bit 201–208 in the summary bitmap 200 is set to a value of "0" if its respective item 167 is not an axis item in the SQL query used to populate the summary table corresponding to the Summary Derived Object 121 with a bitmap position 126 value equal to the bit 201–208 position.

For example, as previously discussed, the ENO item 167 is not an axis item in the SQL query used to populate the SUMB table 55. Also as previously discussed, the Summary Derived Object 145 of the Summary Derived Object table 120 is generated for, and therefore corresponds with, the SUMB table 55. The bitmap position 126 for the Summary Derived Object 145 has a value of "2". Thus, a value of "0" in the second bit 202 (i.e., bit "2") of the summary bitmap 200 for the ENO item 167 indicates that the ENO item 167 is not associated with the Summary Derived Object 145 having a bitmap position 126 value of "2", and, thus, is not associated with the SUMB table 55.

Also as previously discussed, the ENO item 167 is not an axis item in the SQL query used to populate the SUMC table 56. Also as previously discussed, the Summary Derived Object 150 of the Summary Derived Object table 120 is generated for, and therefore corresponds with, the SUMC table 56. The bitmap position 126 for the Summary Derived Object 150 has a value of "3". Thus, a value of "0" in the third bit 203 (i.e., bit "3") of the summary bitmap 200 for the ENO item 167 indicates that the ENO item 167 is not associated with the Summary Derived Object 150 having a bitmap position 126 value of "3", and, thus, is not associated with the SUMC table 56.

Assuming there are no other summary tables in the respective database 50, and no other Summary Derived Objects 121 in the Summary Derived Object table 120, the remaining bits 204–208 of the summary bitmap 200 are set to a value of "0". As there are no Summary Derived Objects 121 with bitmap position 126 values of "3–8", the ENO item 167 can not be associated with these non-existent Summary Derived Objects 121, and thus, its summary bitmap 200 bits 204–208 are all set to a value of "0".

Figure 5B:
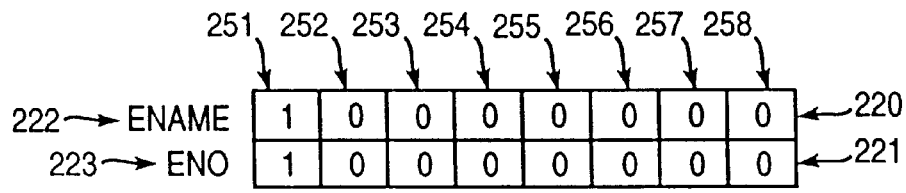

Referring to FIG. 5B, and assuming for purposes of illustration that the summary bitmap 169 data items of FIG. 4 are one byte (i.e., eight bits), and that the SUMA table 54 has been created, or designated for creation. Assume also at this time that the SUMB table 55 and the SUMC table 56 have not been created or designated to be created (i.e., they do not exist). Also, assume that only the Summary Derived Object 140, corresponding to the SUMA table 54, is in the Summary Derived Object table 120 and that the Summary Derived Objects 145 and 150 do not exist. The summary bitmaps 220–221 are the summary bitmaps for the respective ENAME item 222 and the ENO item 223. The first bit 251 (i.e., bit "1") of both the summary bitmaps 220 and 221 corresponds to the Summary Derived Object 140 with a bitmap position 126 value of "1".

Both the ENAME item 222 and the ENO item 223 are axis items in the SQL query used to populate the SUMA table 54. The Summary Derived Object 140 with a bitmap position 126 value of "1" corresponds to the SUMA table 54. Thus, the first bit 251 (i.e., bit "1") of the summary bitmaps 220 and 221 respectively is set to a value of "1". As there are no other summary tables or Summary Derived Objects 121 in existence at this time, the summary bitmaps 220 and 221 for the respective ENAME item 222 and the ENO item 223 have values of "0" in the remaining bits 252–258.

Assuming that subsequent to the SUMA table 54 being designated to be created, the SUMB table 55 is designated to be created, but the SUMC table 56 is still non-existent. Summary bitmaps 224–227 are the summary bitmaps for, respectively the ENAME item 228, the ENO item 229, the DEPTNO item 230 and the sum(SAL) item 231. Assume also at this time that the Summary Derived Objects table 120 contains only the Summary Derived Objects 140 and 145.

Figure 5C:
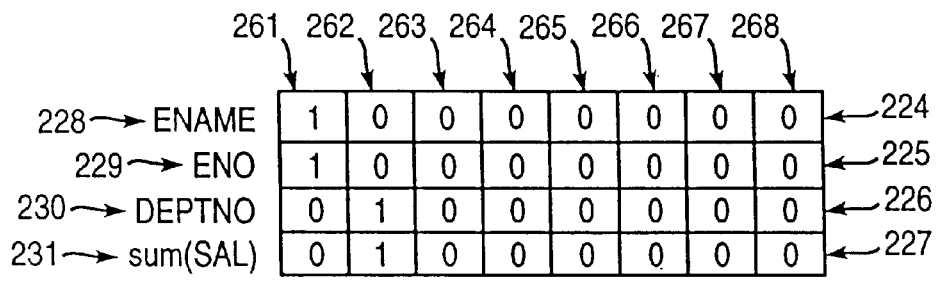

Referring to FIG. 5C, the first bit 261 (i.e., bit "1") of the summary bitmaps 224–227 corresponds to the Summary Derived Object 140 with a bitmap position 126 value of "1". The Summary Derived Object 140 corresponds to the SUMA table 54. Both the ENAME item 228 and the ENO item 229, as previously indicated in reference to FIG. 5B, are axis items in the SQL query used to populate the SUMA table 54. Thus, the first bit 261 of their respective bitmaps 224 and 225 is set to a value of "1". The DEPTNO item 230 and the sum(SAL) item 231 of FIG. 5C are not axis items for the SQL query used to populate the SUMA table 54. Thus, the first bit 261 of their respective summary bitmaps 226 and 227 is set to a value of "0".

The second bit 262 (i.e., bit "2") of the summary bitmaps 224–227 corresponds to the Summary Derived Object 145 with a bitmap position value of "2". The Summary Derived Object 145 corresponds to the SUMB table 55. Neither the ENAME item 228 nor the ENO item 229 is an axis item in the SQL query used to populate the SUMB table 55. Thus, the second bit 262 of their respective bitmaps 224 and 225 remains set to a value of "0". The DEPTNO item 230 and the sum(SAL) item 231 are axis items for the SQL query used to populate the SUMB table 55. Thus, the second bit 262 of their respective summary bitmaps 226 and 227 is set to a value of "1".

As there are no other summary tables or Summary Derived Objects 121 in existence at this time, the summary bitmaps 224–227 for the respective ENAME item 228, ENO item 229, DEPTNO item 230 and sum(SAL) item 231 have values of "0" in the remaining bits 263–268.

Assuming that subsequent to the SUMA table 54 and the SUMB table 55 being designated to be created, the SUMC table 56 is designated to be created. Assume also at this time that the Summary Derived Objects table 120 contains only the Summary Derived Objects 140, 145 and 150. Summary bitmaps 232–237 are the summary bitmaps for, respectively the ENAME item 238, the ENO item 239, the DEPTNO item 240, the sum(SAL) item 241, the DNAME item 242 and the EMP.DEPTNO=DEPT.DEPTNO item 243.

Figure 5D:
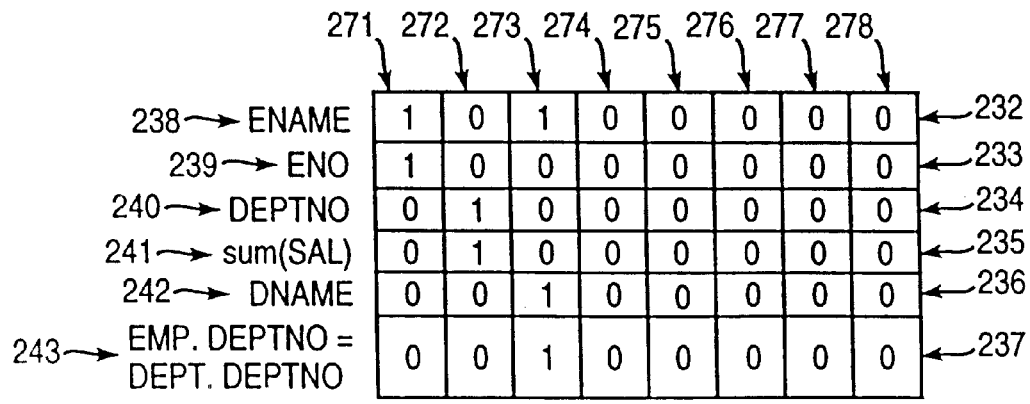

Referring to FIG. 5D, the first bit 271 (i.e., bit "1") of the summary bitmaps 232–237 correspond s to the Summary Derived Object 140 with a bitmap position 126 value of "1". The Summary Derived Object 140 corresponds to the SUMA table 54. Both the ENAME item 238 and the ENO item 239 are axis items in the SQL query used to populate the SUMA table 54. Thus, the first bit 271 of their respective bitmaps 232 and 233 is set to a value of "1". The DEPTNO item 240, the sum(SAL) item 241, the DNAME item 242 and the EMP.DEPTNO=DEPT.DEPTNO item 243 are not axis items for the SQL query used to populate the SUMA table 54. Thus, the first bit 271 of their respective summary bitmaps 234=237 is set to a value of "0".

The second bit 272 (i.e., bit "2") of the summary bitmaps 232–237 corresponds to the Summary Derived Object 145 with a bitmap position value of "2". The Summary Derived Object 145 corresponds to the SUMB table 55. Neither the ENAME item 238, the ENO item 239, the DNAME item 242 nor the EMP.DEPTNO=DEPT.DEPTNO item 243 are axis items in the SQL query used to populate the SUMB table 55. Thus, the second bit 272 of their respective bitmaps 232, 233, 236 and 237 is set to a value of "0". The DEPTNO item 240 and the sum(SAL) item 241 are axis items for the SQL query used to populate the SUMB table 55. Thus, the second bit 272 of their respective summary bitmaps 234–235 is set to a value of "1".

The third bit 273 (i.e., bit "3") of the summary bitmaps 232–237 corresponds to the Summary Derived Object 150 with a bitmap position value of "3". The Summary Derived Object 150 20 corresponds to the SUMC table 56. The ENAME item 238, the DNAME item 242 and the EMP.DEPTNO=DEPT.DEPTNO item 243 are all axis items in the SQL query used to populate the SUMC table 56. Thus, the third bit 273 of their respective bitmaps 232, 236 and 237 is set to a value of "1". Neither the ENO item 239, the DEPTNO item 240, nor the sum(SAL) item 241 are axis items in the SQL query used to populate the SUMC table 56. Thus, the third bit 273 in their respective bitmaps 233–235 is set to a value of "0".

As there are no other summary tables or Summary Derived Objects 121 in existence at this time, the summary bitmaps 232–237 for the respective ENAME item 238, ENO item 239, DEPTNO item 240, sum(SAL) item 241, DNAME item 242, and EMP.DEPTNO=DEPT.DEPTNO item 243 have values of "0" in the remaining bits 274–278.

QUERY PROCESSING

In general, users of a computer system 20 submit user queries to the database applications layer 36 of the respective user station 24 they are operating on. The database applications layer 36 generates a respective SQL query that can be executed by the DBMS 34. The DBMS 34 returns a data result set responsive to the SQL query to the respective database applications layer 36, which presents the information in the data result set to the user.

Figure 6:
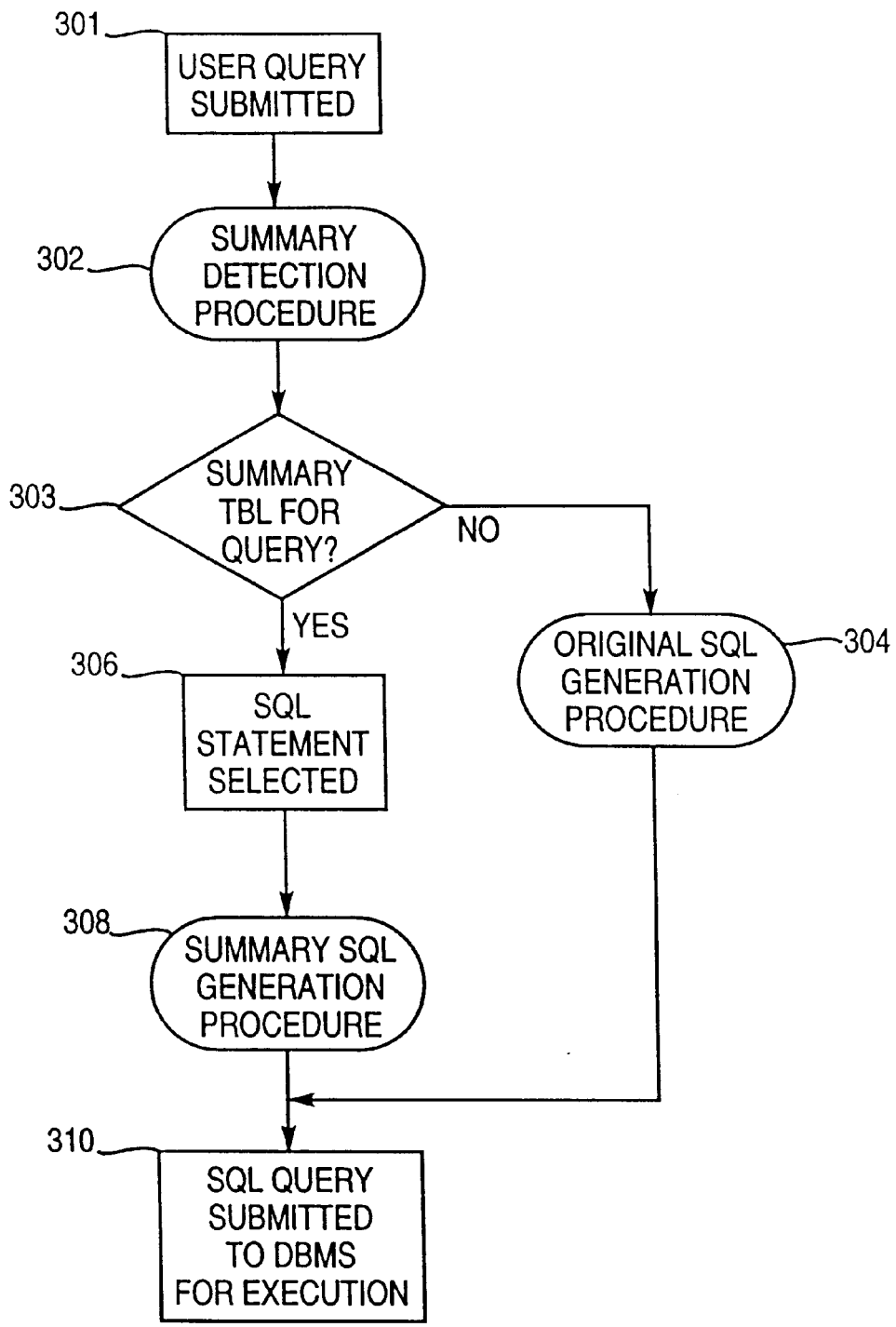
FIG. 6 is a flowchart depicting a preferred methodology for processing a user-submitted query to the computer system of FIG. 1A.

More particularly, referring to FIG. 6, a user submits 301 a query to the database applications layer 36 of a respective user station 24. The database applications layer 36 executes 302 a Summary Detection procedure, described below. The database applications layer 36, as a result of executing 302 the Summary Detection procedure, determines 303 whether or not there is a summary table that can be used to satisfy (i.e., respond to) the user-submitted query. If there is no summary table that can satisfy the user-submitted query, the database applications layer executes 304 an Original SQL Generation procedure and submits 310 the resultant SQL query to the DBMS 34 for execution.

In an Original SQL Generation procedure, the database applications layer generates an SQL query from the user-submitted query that accesses original, detailed database table(s). For example, assuming that there are no summary tables in database 50 (i.e., SUMA table 54, SUMB table 55 and SUMC table 56 do not exist), if a user-submitted query requests the sum(SAL) for each DEPTNO whose salary summation is greater than "120,000", the resultant SQL query will generally read:

select DEPTNO, sum(SAL)
    from (EMP.DEPTNO, EMP.SAL)
    group by DEPTNO
    having sum(SAL)>120000

If there are one or more summary tables that can satisfy the user-submitted query, the database applications layer 36 selects 306 the preferential, or only, if there is only one SQL statement retrieved during the Summary Detection procedure, SQL statement. The database applications layer 36 then executes 308 a Summary SQL Generation procedure, described below. The resultant executable SQL query is submitted 310 to the DBMS for execution.

SUMMARY DETECTION PROCEDURE

By executing 302 a Summary Detection procedure, the database applications layer 36 of a respective user station 24 on which a user has submitted a query determines whether there is one or more summary tables that can satisfy the user query. Additionally, in a presently preferred embodiment, the database applications layer 36 can accomplish this without itself having to know the contents, i.e., data attributes, of the summary tables in existence in the respective database 32. More particularly, by executing 302 a Summary Detection procedure, a respective database applications layer 36 can ascertain whether there is one or more summary tables that can satisfy a user query by its knowledge of the axis items in the respective user query, and its use of the Summary Bitmap table 160 and the Summary Derived Object table 120, rather than by any knowledge it may have of the existence, and respective data attributes, of particular summary tables in the database 32.

Figure 7:
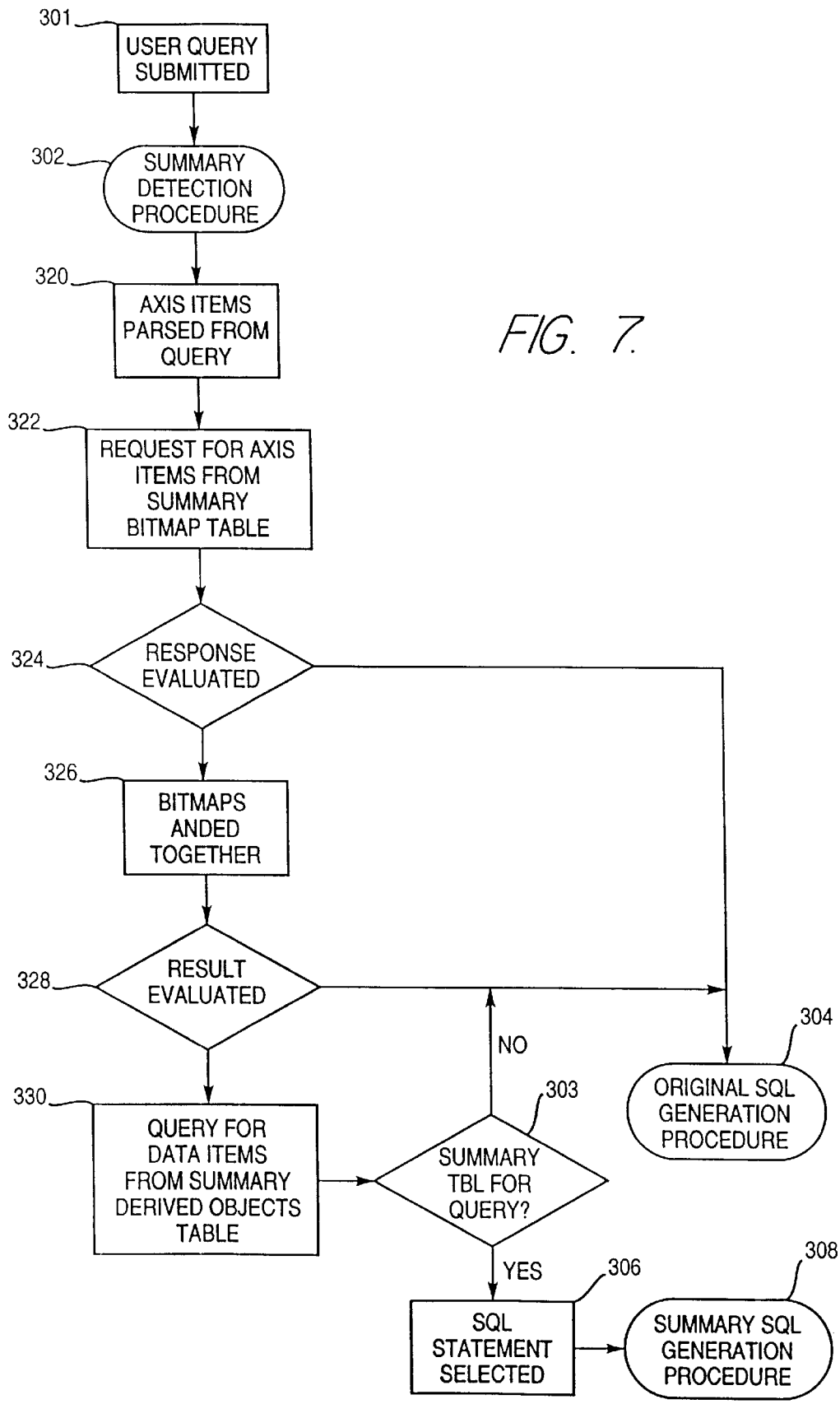
FIG. 7 is a flow chart depicting a preferred methodology for a Summary Detection process.

Referring to FIG. 7, a Summary Detection procedure is executed 302 after a user submits 301 a query to the computer system 20. The respective database applications layer 36 parses 320 (i.e., retrieves) the axis items from the user query. The database applications layer 36 then submits 322 a request to the DBMS 36 to retrieve the records in the Summary Bitmap table 160 for all the axis items of the user-submitted query, and, thereafter, evaluates 324 the data result set retrieved.

If less than all the axis items of the user query are represented in the Summary Bitmap table 160, and, therefore, the database applications layer 36 does not receive a responsive data result for each axis item of the user query, it executes 304 an Original SQL Generation procedure. As previously stated, in the Original SQL Generation procedure, the database applications layer 36 generates an SQL query for the user-submitted query that accesses the appropriate original, detailed tables in the database 50.

If all of the axis items of the respective user query are represented in the Summary Bitmap table 160, i.e., the database applications layer 36 receives a data result for each axis item in response to its Summary Bitmap table retrieval request, then there may be at least one summary table that can satisfy the user query. In a presently preferred embodiment, the database applications layer 36, on receiving a responsive data result set to its Summary Bitmap table retrieval request, ANDs 326 the bitmaps 169 retrieved for each axis item (i.e., performs a logical AND operation on all the respective axis item bitmaps 169).

The database applications layer 36 then evaluates 328 the result of the ANDed bitmaps. If the resultant bitmap bits are all set to a value of "0", there is no summary table that can satisfy the respective user-submitted query. The database applications layer 36 therefore executes 304 an Original SQL Generation procedure.

If there is one bit in the resultant bitmap set to a value of "1", then there is a single summary table that can satisfy the user-submitted query. If there is more than one bit in the resultant bitmap set to a value of "1", then there is more than one summary table that can satisfy the user-submitted query.

The database applications layer 36 submits 330 a request to the DBMS 34 to retrieve various data items from the Summary Derived Object(s) 121 whose bitmap position 126 value corresponds to a bit position of a bit set to a value of "1" in the resultant bitmap. For example, in the resultant bitmap "01100000$_2$", the second bit (i.e, bit "2") and the third bit (i.e., bit "3") are set to a value of "1". Thus, given this resultant bitmap, the database applications layer 36 submits a query (i.e., a Summary Derived Objects retrieval request) for data items from the Summary Derived Object 145, whose bitmap position 126 is set to a value of "2", and the Summary Derived Object 150, whose bitmap position 126 is set to a value of "3".

In a presently preferred embodiment, the database applications layer 36 requests the id 124, the SQL statement 128 and the number of axis items 130 from the Summary Derived Objects 121 whose corresponding bitmap position 126 value is equal to a bit position of a bit in the resultant ANDed bitmap that is set to a value of "1". The retrieved data items from the Summary Derived Objects 121 with the respective least number of axis items 130 are returned to the database applications layer 36 in preferential order. If two or more Summary Derived Objects 120 selected by the database applications layer 36 in the Summary Derived Objects retrieval request have the same number of axis items 130, the data items of the Summary Derived Object 121 with the respective least number of rows 132 are returned to the database applications layer 36 in preferential order.

For example, referring to FIG. 3, if the database applications layer 36 submits a Summary Derived Objects retrieval request for the Summary Derived Objects 140 and 150, the requested data items from the Summary Derived Object 140 will be preferentially returned. This is because the Summary Derived Object 140 has a smaller number of axis items 130 (i.e., "2") than the Summary Derived Object 150 (i.e., "3"). As a further example, if the database applications layer 36 submits a Summary Derived Objects retrieval request for the Summary Derived Objects 140 and 145, the requested data items from the Summary Derived Object 145 will be preferentially returned. This is because, although the Summary Derived Objects 140 and 145 have the same number of axis items 130 (i.e., "2"), the Summary Derived Object 145 has a smaller number of rows 132 (i.e., "120") than the Summary Derived Object 140 (i.e., "2500").

Referring to FIG. 7, upon receiving a responsive data result set for its Summary Derived Object retrieval request, the database applications layer 36 determines 303 if there is one or more summary tables that can satisfy the user query. If not, the database applications layer executes 304 an Original SQL Generation procedure. If, however, there is one or more summary tables that can satisfy the user query, the database applications layer 36 selects 306 the preferentially retrieved, or only retrieved, if only one SQL statement 128 is retrieved, SQL statement 128 and executes 308 a Summary SQL Generation procedure.

The database applications layer 36 of the user station 24 on which a user has submitted a query generates an SQL query (i.e., a Summary Derived Object retrieval request) to select the id 124, SQL statement 128 and number of axis items 130 from the Summary Derived Object(s) 121 whose corresponding bitmap position 126 value is equal to the positions of the bits set to a value of "1" in the resultant ANDed bitmap. Referring to FIG. 8, an exemplary SQL query 350 selects the id (i.e., object_id 352), the number of axis items (i.e., no_of_axis_items 354) and the SQL statement (i.e., object_sql 356) of the Summary Derived Objects in the Summary Derived Objects table (i.e., eul$summary_objects 358) whose corresponding bitmap position (i.e., bitmap_position 360) is equal to "13", "46" and "286".

The SQL query 350 further orders 362 the resultant data items by the number of axis items (i.e., no_of_axis_items 364) and then by the number of rows (i.e., no_of_rows 366) in their respective Summary Derived Objects 121.

In a presently preferred embodiment, when the database applications layer 36 of a user station 24 retrieves data items from the Summary Derived Objects table 120, it limits 368 the responsive data result set to only data items from Summary Derived Objects 121 that have the same number of join axis items 131 as the respective user-submitted query. Thus, "where no_of_joins=:no_of_joins in query" 368 ensures that the data items returned to the database applications layer 36 are retrieved from Summary Derived Object (s) 121 whose corresponding summary table was populated by an SQL statement with the same number of join axis items as is required by the user-submitted query.

The ANDing 326 of the bitmaps for all the axis items in a user-submitted query during the Summary Detection procedure 302 ensures that only Summary Derived Object(s) 121 corresponding to summary tables populated by SQL queries that include all of the join axis items required by the user-submitted query are represented in the resultant bitmap. However, Summary Derived Objects 121 corresponding to summary tables that were populated by SQL queries that include all the join axis items required by the user-submitted query plus additional ones can also be represented in the resultant ANDed bitmap. In some instances, this is undesirable because the use of a summary table that involves join axis items additional to those of the user query can adversely affect the responsive data result set.

For example, a user request for the average department salaries of all company employees would normally entail accessing an original, detailed table (e.g., the EMP table 51) containing the employee names (e.g., the ENAME column 61 data items) and their respective department number (e.g., the DEPTNO column 63 data items) and salary (e.g., the SAL column 64 data items). Further, assume a summary table containing the average department salaries (avg(SAL)) for all managers of the respective company is created by joining the EMP table 51 with a second, original MGR table containing only the names of managers of the company (i.e., a subset of the ENAME column 61 column data items). If the summary table is accessed to satisfy the user request, the data result set will be incomplete. More particularly, by accessing the summary table created with one join when the original user request involved no joins results in the user receiving only the average department salaries for managers, rather than the average department salaries for all the employees of the respective company.

In a presently preferred embodiment, the database applications layer 36 executing 302 a Summary Detection procedure also limits. 370 the responsive data result set to the SQL query 350 based on the summary threshold date 134 of the respective Summary Derived Objects 121. Generally, the Summary Derived Objects 121 whose associated summary tables are deemed too old are not considered in the Summary Detection procedure, or the subsequent Summary SQL Generation procedure, because their data is potentially out of date. Thus, the SQL query 350 limits 370 the responsive data result set to include only those data items from the Summary Derived Objects table 120 whose respective data is deemed current.

The end user can help determine whether or not a particular summary table's data is to be accessed for a respective user submitted query by including a max_age_of_ summary value 374 with its user request. If the summary threshold date 134 (i.e., summary_threshold_date 372) of a Summary Derived Object 121 is not greater than the system date (i.e., sysdate 376) less the max_age_of_ summary value 374 supplied by the user, the respective Summary Derived Object 121, and, thus, its corresponding summary table, will not be accessed for the respective user-submitted query.

SUMMARY SQL GENERATION PROCEDURE

As previously stated, once the Summary Detection procedure is complete, the respective database applications layer 36 processing a user-submitted query executes 304 an Original SQL Generation procedure if there is no responsive summary table for the user query.

Figure 9:
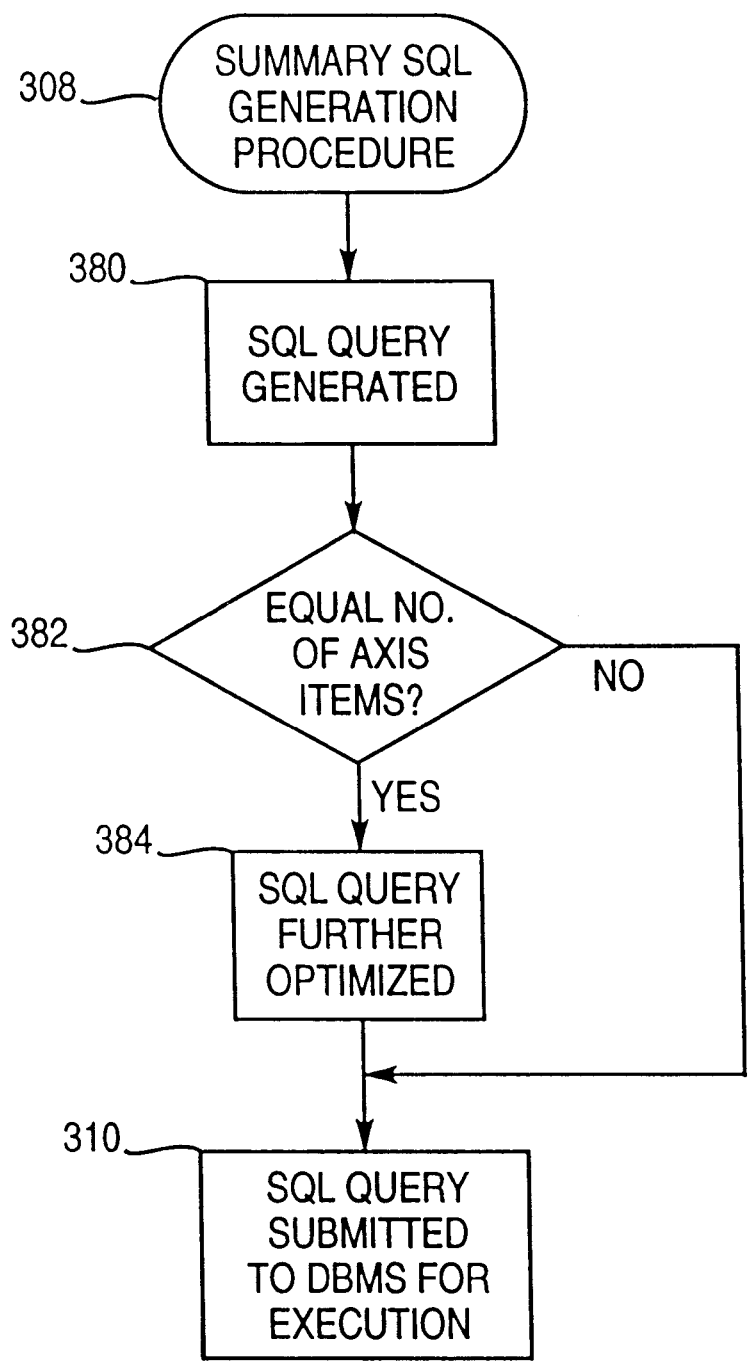
FIG. 9 is a flowchart depicting a preferred methodology for generating an executable SQL query that accesses a summary table.

If there are one or more summary tables that can satisfy the user-submitted query, the database applications layer 36 executes 308 a Summary SQL Generation procedure. Referring to FIG. 9, the Summary SQL Generation procedure is executed 308. The respective database applications layer 36 processing a user-submitted query uses the selected SQL statement 128, retrieved from the Summary Derived Object table 120 during the Summary Detection procedure, and the user-submitted query to generate 380 a respective executable SQL query.

For example, if a user-submitted query requests the sum (SAL) for each DEPTNO whose salary summation is greater than "120,000", the resultant SQL query, accessing the SUMB summary table 55 would generally read:

select DEPTNO, sum("sum(SAL)")
    from (select DEPTNO as DEPTNO, sum(SAL) as "sum (SAL)"
    from SUMB
    where summary_derived_object_id=78)
    group by DEPTNO
    having sum("sum(SAL)")>120000

The database applications layer 36 determines 382 if the Summary Derived Object 121 corresponding to the selected SQL statement 128 retrieved during the Summary Detection process has the exact number of axis items 130 as the respective user query. The database applications layer 36 does so by comparing the number of axis items parsed 320 (FIG. 7) from the user query with the number of axis items 130 retrieved 330 (FIG. 7) from the Summary Derived Objects table 120 along with the selected SQL statement 128. If the number of axis items 130 from the respective Summary Derived Object 121 equals the number of axis items in the user-submitted query, the SQL query generated above can be further optimized 384.

For example, the Summary Derived Object 145, which is associated with the SUMB table 55, has the same number of axis items 130 (i.e., "2") as the user-submitted query for the average salary for each department number of a company. Thus, the executable SQL query above can be further optimized 384 as follows:

select DEPTNO, sum("sum(SAL)")
    from (select DEPTNO as DEPTNO, sum(SAL) as "sum (SAL)"
    from SUMB
    where summary_derived_object_id=78)
    where "sum(SAL)">120000

In this example, the executable SQL query has been optimized to remove the "group by" limitation and to convert the "having" clause of the previously generated SQL query to a "where" clause, as the SUMB summary table 55 contains exactly the data items requested by the user-submitted query.

If the number of axis items 130 in the Summary Derived Object 121 of the respective selected SQL statement 128 is greater than the number of axis items in the user-submitted query, the additional axis items are accounted for in the generated executable SQL query. For example, assume the SUMB table 55 has an additional LOC (location) data attribute. The respective SQL statement in the Summary Derived Object 121 corresponding to the SUMB table 55 will select the data items from this LOC data attribute. Thus, the executable SQL query accessing the SUMB table 55 with the additional LOC data attribute will generally read as follows:

select DEPTNO, sum("sum(SAL)")
    from (select DEPTNO as DEPTNO, sum(SAL) as "sum (SAL)",
        LOC as LOC
        from SUMB
        where summary_derived_object_id=78)
    group by DEPTNO
    having sum("sum(SAL)")>120000

The LOC data attribute is necessarily incorporated in the immediately preceding executable SQL query because the respective SQL statement 128 used to generate this query incorporates this data attribute of the respective summary table.

The "group by DEPTNO" limitation in the above executable SQL query ensures that the appropriate data result set is returned for the user. The addition of the LOC data attribute in the SUMB table 55 may mean that there are additional records in the SUMB table 55 that do not have responsive data items for a respective user-query that otherwise finds the SUMB table 55 responsive. More particularly, when a summary table accessed for a respective user query has more axis items associated with it than the user query, the summary table, while responsive to the user query, will have more information than requested by the user query. The "group by" limitation, in such a case, ensures that an appropriate data result is returned to the user.

Once a data applications layer 36 generates an optimum executable SQL query for a respective user-submitted query, the SQL query is submitted 310 to the DBMS 34 for execution. The DBMS 34 thereafter returns a responsive data result set to the data applications layer 36, to be presented to the user.

SUMMARY TABLE EXTENSIONS

In a presently preferred embodiment, the database applications layer 36 of a respective user station 24 generates a Summary Derived Object 121 and respective SQL statement 128 when a new summary table is designated to be created. In a presently preferred embodiment, the respective database applications layer 36 also generates a Summary Derived Object 121 and respective SQL statement 128 for selecting the data items in the summary table and each of the data attributes in the original detailed table(s) from which the summary table was derived that are not included in the summary table.

For example, the SUMA table 54 is created from data attributes in the EMP table 51. An SQL statement 128 is generated that the SUMA table 54 is responsive to, and that SQL statement is included in the Summary Direct Object 140 corresponding to the SUMA table 54. Records 170 and 172 for the ENAME and the ENO items 167 respectively are generated and stored in the Summary Bitmap table 160.

The respective database applications layer 36 also generates an SQL statement for joining the SUMA table 54 and the EMP table 51, and retrieving the data items from the ENAME column 70 and the ENO column 71 data of the SUMA table 54 and the DEPTNO column 65 of the EMP table 51. In a presently preferred embodiment, an actual new summary table is not created and populated for this combination. The database applications layer 36 does generates a Summary Derived Object 121 for the SQL statement 128 that selects the ENAME column 70, the ENO column 71, and the DEPTNO column 63 data items using, for example, the ENAME data attribute 61 and 70 of the respective EMP table 51 and DEPT table 54 as the join of the tables. The database applications layer 36 also generates a record 165 in the Summary Bitmap table 160 for the join item 167 (i.e., EMP.ENAME=SUMA.ENAME) and updates record 174 for the DEPTNO item 167.

Likewise, the database applications layer 36 generates an SQL statement 128 for retrieving the data items from the ENAME column 70 and the ENO column 71 of the SUMA table 54 and the SAL column 64 of the EMP table 51. As in the previous example, in a presently preferred embodiment, an actual new summary table is not created and populated for this combination. The database applications layer 36 generates a Summary Derived Object 121 for the SQL statement 128 that selects the data items from the ENAME column 70, the ENO column 71 and the SAL column 64, using the same exemplary EMP.ENAME=SUMA.ENAME join as in the previous example. The database applications layer 36 also updates the bitmap 169 in the Summary Bitmap table 160 for the EMP.ENAME=SUMA.ENAME item 167 and generates a record 165 for a SAL item 167. (This new record 165 for a SAL item 167 will not include a function 168, which record 176, also for a SAL item 167, does.)

In this presently preferred embodiment, a user-submitted query requesting information from both a summary table and an original, detailed table the summary table was derived from, can take advantage of the benefits of the summary table.

While preferred embodiments are disclosed herein, many variations are possible which remain within the spirit and scope of the invention. Such variations are clear after inspection of the specification, drawings and claims herein. The invention therefore is not to be restricted except by the scope and spirit of the appended claims.

What is claimed is:

1. A method for processing a database query, comprising:
receiving a database query;
parsing the database query into one or more axis items;
identifying a pre-generated query which can populate a table of a database, and which comprises all of the one or more axis items of the database query;
generating an executable query using the pre-generated query; and
executing the executable query to retrieve data requested by the database query.

2. The method of claim 1, further comprising
retrieving, for each of the axis items, a bitmap associated with the axis item, a bitmap comprising a plurality of bits in which the position of each of the plurality of bits is associated with a table, and
processing the retrieved bitmaps to identify the pre-generated query.

3. The method of claim 2, in which processing the retrieved bitmaps comprises executing a logical AND operation on the retrieved bitmaps to generate a resultant bitmap.

4. The method of claim 3, further comprising retrieving a plurality of pre-generated queries stored in a database, one for each bit in the resultant bitmap that is set to a value of one.

5. The method of claim 4, in which retrieving a plurality of pre-generated queries comprises retrieving only those pre-generated queries that comprise the same number of join axis items as the database query.

6. The method of claim 4, in which identifying a pre-generated query comprises identifying the pre-generated query of the plurality of pre-generated queries that comprises the least number of axis items.

7. The method of claim 4, in which identifying a pre-generated query comprises identifying the pre-generated query of the plurality of pre-generated queries that comprises a minimum number of axis items and in which the table that the identified pre-generated query can populate comprises the least number of rows.

8. A method for providing access to a table in a database, comprising:

generating a query that the table is responsive to;

storing the query in a database;

generating a bitmap for each axis item of the query, each respective bitmap comprising a plurality of bits; and setting a bit in each bitmap to a value of one, in which the set bit is indicative of the table.

9. The method of claim 8, further comprising storing the query in a record in a table in the database and storing each bitmap in a record in a table in the database.

10. The method of claim 9, in which the record comprising the query is stored in a first table in the database and each record comprising a bitmap is stored in a second table in the database, the first table being a different table than the second table.

11. The method of claim 9, in which the record comprising the query further comprises a bitmap position value corresponding to a bit position in the bitmaps.

12. The method of claim 9, in which the record comprising the query further comprises the number of axis items associated with the query and the number of data records in the table.

13. The method of claim 8, in which the table is a summary table.

14. A method for supporting the processing of database queries with summary tables, comprising:

generating a plurality of summary tables for a database;

creating a query for each of the plurality of summary tables;

storing each query for each of the plurality of summary tables in a database;

generating a table comprising a plurality of records, each record identifying an axis item in a query for a summary table of the database; and creating a bitmap for each axis item in the table, a bitmap comprising an indication of the summary tables in the database whose query comprises the respective axis item.

15. The method of claim 14, further comprising generating a summary object table comprising a plurality of summary object records, each summary object record identifying a summary table, and storing a query for a summary table in the summary object record that identifies the respective summary table.

16. The method of claim 15, in which each summary object record further comprises the number of axis items of the query for the respective summary table and the number of data records in the respective summary table.

17. A method for processing a database query, comprising:

retrieving, for each axis item of a database query, a bitmap associated with the respective axis item, each bitmap comprising a plurality of bits in which the position of each of the plurality of bits is associated with a table in a database;

executing a logical operation on the retrieved bitmaps to generate a resultant bitmap;

retrieving a pre-generated query stored in a database, the pre-generated query associated with a bit in the resultant bitmap;

generating an executable query using the pre-generated query; and executing the executable query to retrieve data requested by the database query.

18. The method of claim 17, further comprising identifying a table in a database for each bit that is set in the resultant bitmap, and determining those tables that are identified that have a pre-generated query associated with them which has the same number of join axis items as the database query.

19. The method of claim 17, further comprising identifying a table in a database for each bit that is set in the resultant bitmap, and determining those tables that are identified that have a pre-generated query associated with them which has the least number of axis items.

20. The method of claim 18, in which, from those tables that are identified that have a pre-generated query associated with them which has the least number of axis items, determining a table that has the least number of data records.

21. The method of claim 17, in which executing a logical operation comprises ANDing all of the retrieved bitmaps together to generate the resultant bitmap.

22. A system supporting the processing of database queries, comprising:

a plurality of database tables;

a plurality of summary tables;

a query for each of the plurality of summary tables, each query stored in a database;

a bitmap table comprising a plurality of bitmap records, each bitmap record corresponding to an axis item of a query for a summary table; and a bitmap for each axis item, a bitmap comprising an indication of the summary tables whose query comprises the respective axis item.

23. The system of claim 22, further comprising a summary object table comprising a plurality of summary object records, each summary object record corresponding to a summary table and comprising the query for the respective summary table.

24. The system of claim 23, in which each summary object record further comprises the number of axis items of the query for the respective summary table and the number of data records in the respective summary table.

25. The system of claim 22, further comprising a first program for generating the plurality of bitmap records of the bitmap table and a second program for processing a database query in which a bitmap record is accessed.

* * * * *